US011552531B2

(12) United States Patent
Durand

(10) Patent No.: US 11,552,531 B2
(45) Date of Patent: Jan. 10, 2023

(54) ELECTRICAL MACHINE AND METHOD FOR MANUFACTURING SAME

(71) Applicant: L'Air Liquide, Societe Anonyme pour l'Etude et l'Exploitation des Procedes Georges Claude, Paris (FR)

(72) Inventor: Fabien Durand, Voreppes (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 433 days.

(21) Appl. No.: 16/755,144

(22) PCT Filed: Aug. 1, 2018

(86) PCT No.: PCT/FR2018/051976
§ 371 (c)(1),
(2) Date: Apr. 9, 2020

(87) PCT Pub. No.: WO2019/073130
PCT Pub. Date: Apr. 18, 2019

(65) Prior Publication Data
US 2020/0303985 A1  Sep. 24, 2020

(30) Foreign Application Priority Data

Oct. 9, 2017 (FR) .................... FR 1701042

(51) Int. Cl.
*H02K 9/19* (2006.01)
*H02K 5/20* (2006.01)
(Continued)

(52) U.S. Cl.
CPC .............. *H02K 9/19* (2013.01); *H02K 5/20* (2013.01); *H02K 5/203* (2021.01); *H02K 9/00* (2013.01); *H02K 9/193* (2013.01); *H02K 15/14* (2013.01)

(58) Field of Classification Search
CPC .......... H02K 15/14; H02K 5/20; H02K 5/203; H02K 5/10; H02K 9/00; H02K 9/02;
(Continued)

(56) References Cited

U.S. PATENT DOCUMENTS 9,065,312 B2   6/2015 Fernandes Goncalves
2008/0174190 A1* 7/2008 Kurata .................... H02K 1/18
                                                         310/54
(Continued)

FOREIGN PATENT DOCUMENTS

CN   102 904 371    8/2014
CN   207 234 587    4/2018
(Continued)

OTHER PUBLICATIONS

International Search Report and Written Report for PCT/FR2018/051976, dated Oct. 1, 2018.

*Primary Examiner* — Alexander A Singh
(74) *Attorney, Agent, or Firm* — Justin K. Murray

(57) ABSTRACT

The invention relates to an electrical machine comprising a stator and a rotor that are disposed in a casing comprising a first face provided with ribs and intended to be in contact with a cooling fluid, the machine being provided with a closing structure which is fastened in a leaktight manner to the first face of the casing so as to delimit with the first face of the casing a space forming a circuit for the cooling fluid of the motor, the closing structure being fastened to the first face of the casing by welding and/or brazing and/or crimping and comprising at least one cover, characterized in that the closing structure is fastened to the casing by welding and/or brazing and/or crimping only at said ribs.

12 Claims, 3 Drawing Sheets

(51) Int. Cl.
*H02K 9/193* (2006.01)
*H02K 15/14* (2006.01)
*H02K 9/00* (2006.01)

(58) Field of Classification Search
CPC .. H02K 9/04; H02K 9/06; H02K 9/08; H02K 9/10; H02K 9/12; H02K 9/14; H02K 9/16; H02K 9/18; H02K 9/19; H02K 9/193; H02K 9/197; H02K 1/20
USPC ............ 310/89, 52, 54, 57, 58, 59, 60 A, 64
See application file for complete search history.

(56) References Cited

U.S. PATENT DOCUMENTS

2013/0328423 A1* 12/2013 Ikeda .................. H02K 9/19
  310/54
2016/0028292 A1* 1/2016 Lin .................. H02K 5/203
  310/64
2017/0288493 A1* 10/2017 Ohashi .................. H02K 5/203

FOREIGN PATENT DOCUMENTS

| EP | 2 680 408 | 1/2014 |
| JP | H06 70507 | 3/1994 |
| JP | H07 111759 | 4/1995 |
| JP | H07 336946 | 12/1995 |
| JP | H08 103053 | 4/1996 |
| JP | H08 111966 | 4/1996 |
| JP | 2007 143247 | 6/2007 |
| JP | 2015 059715 | 3/2015 |
| WO | WO 2016/018828 | 2/2016 |
| WO | WO 2017/071970 | 5/2017 |

\* cited by examiner

ELECTRICAL MACHINE AND METHOD FOR MANUFACTURING SAME

CROSS-REFERENCE TO RELATED APPLICATIONS

This application is a § 371 of International PCT Application PCT/FR2018/051976, filed Aug. 1, 2018, which claims § 119(a) foreign priority to French patent application FR 1701042, filed Oct. 9, 2017.

BACKGROUND

Field of the Invention

The invention relates to an electric machine and the method for manufacturing same.

The invention relates more particularly to an electric machine, in particular an electric motor, comprising a stator and a rotor that are disposed in a casing, the casing comprising a first face provided with ribs and intended to be in contact with a fluid for cooling the machine, the machine being provided with a closing structure which is fastened in a sealed manner to the first face of the casing so as to delimit with the first face of the casing a space that forms a circuit for the fluid for cooling the motor, the closing structure being fastened to the first face of the casing by welding and/or brazing and/or crimping and comprising at least one cover.

Related Art

It is known to provide a circuit for cooling electric motors (and in particular the stator of motors), cf. for example EP2680408A1.

Known solutions provide (cf. FIG. 1) for the casing 10 surrounding the rotor 3 and the stator 12 to have ribs 4 that form one or more helical channels. The ribbed face of the casing 10 is closed in a sealed manner by a closing structure (cover 6, tubes 7, 8) so as to form a cooling circuit 5 around the motor. In the configuration in FIG. 1, the casing 10 is made up of a plurality of parts that are joined together by screw-fastened connections and sealed with elastomer O-rings 9, 13. This solution has numerous drawbacks, including:

a low mechanical strength of screw-fastened components compared with a one-piece system, the need for a relatively significant thickness of the casing 10 so as to allow screws 2 and the seal 13 to be housed therein while making it possible to fit the tubular cover 6, the need to use a material with high thermal conductivity for the casing 10 in order to limit the temperature of the motor stator. Specifically, the great thickness of the casing 10 has to be compensated by a higher thermal conductivity, the risk of corrosion of the casing 10 by the cooling fluid or the environment in the volume surrounding the casing. This risk is linked to the choice of the material with high thermal conductivity (aluminum alloy, for example), the risk of leaking between the motor cavity and the volume surrounding the casing 10 through the seal 13, the risk of deterioration of the seals over time and consequently the risk of having to disassemble the system for maintenance.

In the configuration in FIG. 2, the motor casing 10 is made up of a plurality of parts that have been joined together by welding or brazing. The drawbacks of this solution are:

the possible need for a heat treatment after welding with a view to geometrically stabilizing the casing 10, the need to carry out a finishing machining operation after welding in order to ensure the correct geometry of the casing 10 and the correct fit between the motor stator 2 and the casing 10.

Specifically, the manufacturing (welding) of this motor structure creates deformations of the casing 10, which are detrimental to the precise relative dimensioning between the stator 12 and the casing 10.

In the configuration in FIG. 3, the motor casing 10 is in one piece and the component 16 comprising the channels of the cooling circuit 5 is inserted into said casing 10. The fluid flowing between the casing 10 and the component 16 is sealed off from the motor cavity by seals 9. The drawbacks of this solution are:

the risk of leaking between the motor cavity and the cooling fluid, the risk of deterioration of the seals 9 over time and consequently the risk of having to disassemble the system for maintenance.

Another solution (not shown in a figure) consists in replacing the O-rings with welds or brazes in the configuration in FIG. 3. The drawbacks of this solution are:

the risk, linked to corrosion or fatigue, of leaking between the motor cavity and the cooling fluid through a defective weld, the need to carry out a finishing machining operation after welding or brazing in order to ensure the correct geometry of the casing and the correct fit between the motor stator 12 and the component 6.

SUMMARY OF THE INVENTION

An aim of the present invention is to remedy all or some of the drawbacks of the prior art that are set out above.

To this end, the electric machine according to the invention, which is otherwise in accordance with the generic definition thereof given in the preamble above, is essentially characterized in that the closing structure is fastened to the casing by welding and/or brazing and/or crimping only at said ribs.

Thus, this structure makes it possible to localize the deformations associated with welding and/or brazing in zones which have no significance in terms of fit for the geometry of the casing. The invention may use a one-piece casing (a casing made of one component) that may be manufactured from a material with low thermal conductivity such as stainless steel for example.

This structure makes it possible to increase the robustness and the service life of the device. In addition, this solution makes it possible to reduce the complexity and therefore the cost and manufacturing time of the motor assembly and the casing thereof.

Furthermore, embodiments of the invention may have one or more of the following features:

the machine has a plurality of ribs extending in a direction of the machine and the closing structure is fastened to the end ribs, that is to say to the ribs situated at the two ends of the plurality of ribs in the direction, by welding and/or brazing and/or crimping, the ribs each have a lower end that is secured to the casing and a terminal upper end to which the closing structure is welded and/or brazed and/or crimped, the ribs have a geometry, and in particular a thickness and a height, that gives them a flexibility greater than the flexibility of the rest of the body of the casing to which they are secured, the ribs have a flexibility, that is to say a deformability (in mm) per unit of deformation force (in newtons), which is at least two times and preferably five times greater than the flexibility of the rest of the casing body, the ribs have a thickness or width that is two to four times less than that of the rest of the casing body, the ribs have a thickness of between 0.5 and 5% of the transverse dimension or of the outside diameter of the stator, the ribs have a height of between two and twenty times their thickness, the closing structure comprises at least one tube that is welded to the ribs and/or to the cover and forms an inlet or an outlet for the cooling fluid, the machine has no mechanical sealing system or screw-fastening system between the closing structure and the casing, the cooling circuit contains a heat transfer liquid, the ribs form one or more helical grooves or one or more non-helical circular grooves in the first face of the casing about a longitudinal axis of the casing.

The invention also relates to a method for manufacturing an electric machine, in particular a motor, in accordance with any one of the features above or below, the machine comprising a stator and a rotor that are disposed in a casing, the casing comprising a first face provided with ribs and intended to be in contact with a fluid for cooling the machine, the method comprising a step of fastening a sealed closing structure to the first face of the casing so as to delimit, with the first face of the casing, a circuit for the fluid for cooling the motor, wherein the closing structure comprises at least one cover and the closing structure is fastened to the first face of the casing and only to said ribs, and in particular to the end ribs, that is to say the ribs situated at the two ends of the plurality of ribs, by welding.

According to other possible particular features:

at the end of the step of welding the closing structure to the first face of the casing, the method does not have at least one of: a finishing machining operation for the casing so as to correct a deformation of the casing, and a heat treatment of the casing intended to geometrically stabilize the casing.

The invention may also relate to any alternative device or method comprising any combination of the features above or below.

BRIEF DESCRIPTION OF THE FIGURES

Further particular features and advantages will become apparent on reading the following description, which is given with reference to the figures, in which.

DETAILED DESCRIPTION OF THE INVENTION

Figure 4:
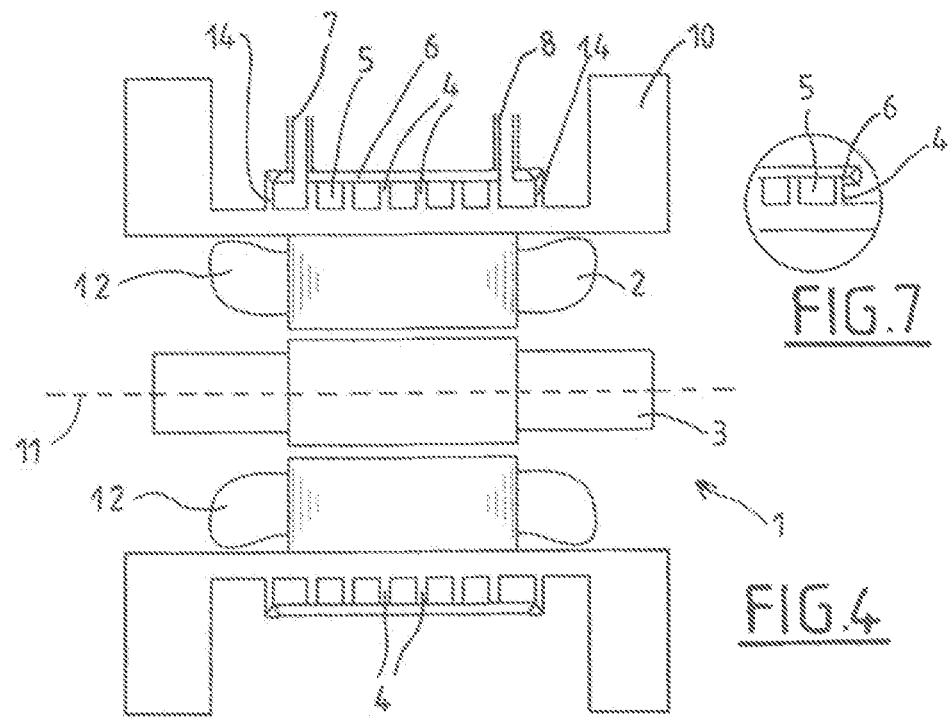
FIG. 4 shows a schematic and partial view in cross section, illustrating a first exemplary embodiment of the invention.

The electric machine 1 (in particular the electric motor) illustrated in FIG. 4 comprises a stator 12 and a rotor 3, which are disposed in a casing 10. The stator 12 is disposed around the rotor 3, about a longitudinal axis 11.

The casing 10 has a shape which is preferably axisymmetric (symmetric about the axis 11) and for example tubular and cylindrical and arranged around the stator 12 (about the longitudinal axis 11). The casing 10 is preferably a one-piece metal component (that is to say a component not made up of a plurality of joined-together parts).

For example, the stator 12 may be fitted in the casing 10 by way of an interference fit or an intermediate element with a view to reducing the contact resistance (thermal grease or adhesive for example).

The casing 10 has an outer face (a face turned toward the outside of the motor) and an inner face in contact with the stator 12.

The outer face of the casing 10 is intended to be in contact with a fluid for cooling the machine 1.

The outer face is provided with ribs 4, 14 that form for example one or more channels for the cooling fluid. The machine 1 furthermore comprises a closing structure 6, which is fastened in a sealed manner to the casing 10 (to the outer face at the ribs 4). This closing structure 6 delimits, with this face of the casing 10, a sealed circuit 5 for the fluid for cooling the motor 1. This closing structure is fastened to the casing 10 by welding and comprises at least one cover 6 (tubular wall or sleeve surrounding the casing 10).

This cover 6 (or sleeve), which is joined to the casing 10 by a weld and/or a braze may be made of a single component or a plurality of shells with a view to making it easier to fit around the casing 10.

This closing structure also comprises an inlet tube 7 and an outlet tube 8 for the cooling fluid between the two ends of the circuit of channels that is delimited by the ribs 4.

The closing structure 6 may be made up of a plurality of components that are joined together by welding and/or brazing and/or crimping.

These components 7, 8, which are used for feeding and evacuating the cooling fluid at the inlet and outlet of the circuit 5, may alternatively be realized by channels integrated in the casing 10 and/or the cover 6.

According to one particular feature of the solution, the closing structure 6 is fastened to the casing 10 by welding and/or brazing (and/or crimping), but only at said ribs 4, 14.

Preferably, the closing structure 6 is fastened to the casing 10 by welding and/or brazing only at the end ribs 14 which delimit the circuit 5. In other words, when there is a plurality of ribs 4, 14, as illustrated in the figures, the fastening is performed at (and preferably only at) the ribs 14 which are situated at the two ends of the succession of ribs and which surround the rest of the ribs 4. In the case in which there are only a few ribs 14 at the two ends of the circuit (no ribs 4 therebetween), the closing structure 6 is fastened (by welding, brazing etc.) to these ribs 14 (and only thereto).

For example, the closing structure 6 is fastened to the first rib 14 and the last rib 14 in the direction of the longitudinal axis 11.

Of course, additional welding/brazing may also be provided at the ribs 4 situated between the end ribs 14.

Thus, the welding or brazing of the cover 6 (and optionally the tubes 7, 8) to the casing 10 is carried out only at the ribs 14 or the lips of the casing 10.

The welding method may advantageously be of the laser or electron beam type, but any other welding or brazing method may be used.

The cover 6 may advantageously be joined to the lips 14 of the casing 10 by a crimping method.

These ribs 14 are the welding or brazing support and thus make it possible to localize the deformations associated with the welding method in these ribs 14 and in the component 6 without causing any deformation of the other parts of the casing 10.

Figure 1:
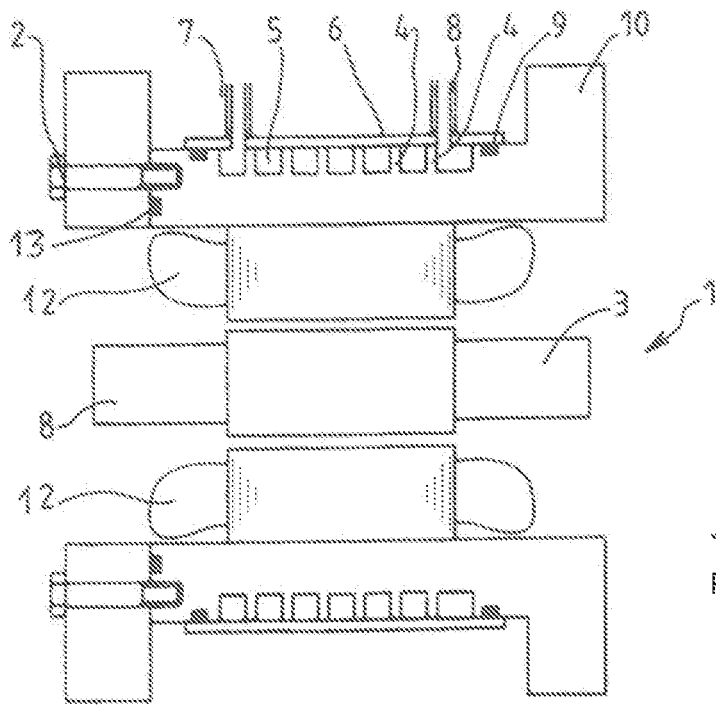
FIGS. 1 to 3 show schematic and partial views in cross section, illustrating three examples of known geometries of electric machines.
Figure 2:
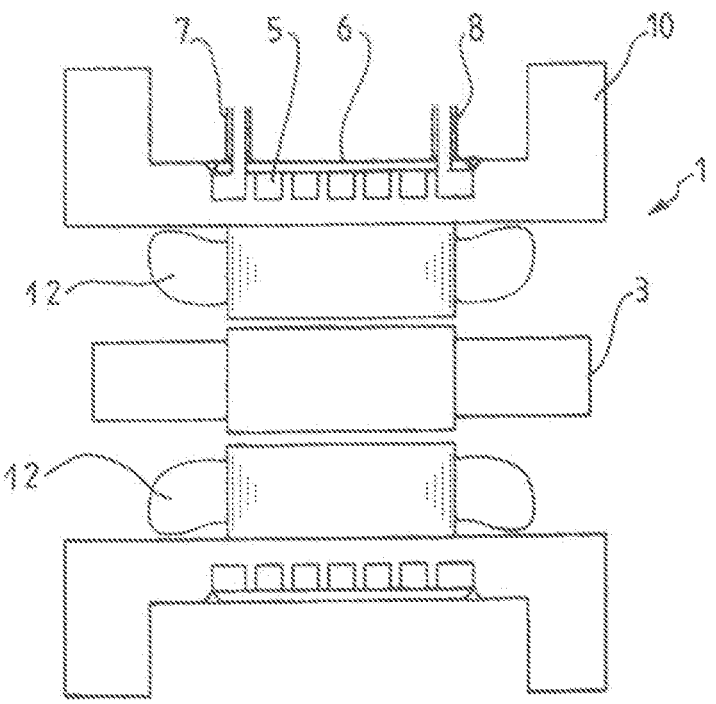
Figure 3:
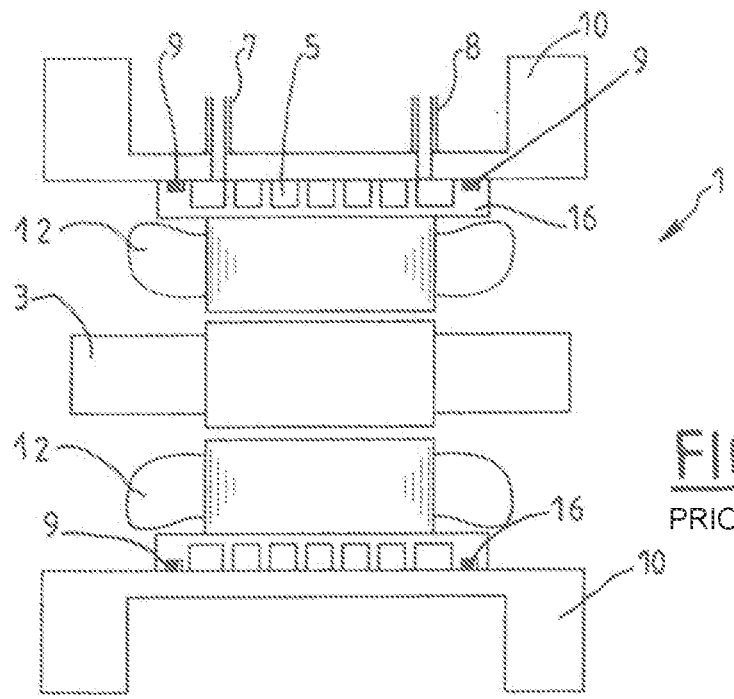
Figure 7:
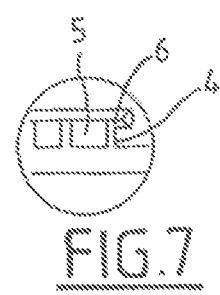
FIG. 7 shows a schematic and partial cross section of a detail of an electric machine, illustrating a possible geometry variant (ribs, fastening).

The ribs 14 each have a lower end, which is secured to the casing 10, and a terminal upper end, to which the closing structure 6 is welded or brazed. As illustrated in FIG. 7, in cross section on a longitudinal plane passing through the longitudinal axis 11, the ribs 4, 14 may have any other shape than that of a parallelepipedal tooth, for example an inverted L shape, a bracket shape or a T shape in particular.

The welds or brazes are thus realized only at relatively more flexible parts of the casing 10 which make it possible to localize deformations due to the welding or brazing process without affecting the relative dimensioning of the rest of the casing 10.

Specifically, these ribs 14 preferably have a geometry, and in particular a thickness and a height, which gives them a flexibility greater than the flexibility of the rest of the body of the casing 10 to which they are secured.

Thus, any other rib 14 geometry that makes it possible to prevent the rest of the casing 10 from deforming after the welding or brazing phase may be envisaged. There is a risk of leaking between the cooling fluid and the volume around the casing 10 through the weld or braze; this is not detrimental to the motor and is easy to detect and repair.

This structure makes it possible to dispense with the presence of (a) mechanical seal(s) according to the prior art.

The ribs 14 have for example a flexibility, that is to say a deformability in mm per unit of deformation force in newtons, which is at least two times and preferably five times greater than the flexibility of the rest of the casing 10 body.

The ribs 14 have for example a thickness or width (in a direction parallel to the longitudinal axis 11) that is two to four times less than that of the rest of the casing 10 body.

Thus, for example, the width (or section) of the ribs 14 to which the closing structure 6 is welded or brazed is at least two times less (and preferably three to four times less) than the width or section of the portion of the casing 10 body to which it is attached.

The ribs 14 have for example a thickness of between 0.5 and 5% of the outside diameter of the stator 12.

Similarly, the ribs 14 have for example a height (perpendicular to the longitudinal axis 11) of between two and twenty times the thickness thereof.

This structure/configuration has numerous advantages over the known solutions, and in particular all or some of the following advantages:

the risk of leaking between the motor cavity and the cooling fluid is almost zero since it is a one-piece component (casing 10) that provides this seal, the risk of leaking between the motor cavity and the volume around the casing 10 is almost zero since it is a one-piece component that provides this seal, the solution makes it possible not to use a screw-fastened assembly or seals, the absence of a mechanical seal is possible and results in an absence of maintenance, the service life of the structure is increased (typically by several tens of years), given the simplicity of the structure, the invention is very reliable, the solution makes it possible to dispense with heat treatment after welding or brazing with a view to geometrically stabilizing the casing, the solution makes it possible to dispense with a finishing machining operation after welding so as to ensure the correct geometry of the casing, the solution makes it possible to use sparingly oxidizable material of stainless steel type for the casing and the other components, the use of sparingly oxidizable material allows the solution to accept a multitude of cooling fluids, the solution makes it possible to limit the temperature of the stator by limiting the thickness of material between the stator and the cooling fluid, the one-piece design of the casing 10 allows the machine to have a high pressure resistance, the design and manufacturing simplicity makes it possible to limit the manufacturing time and cost.

Figure 5:
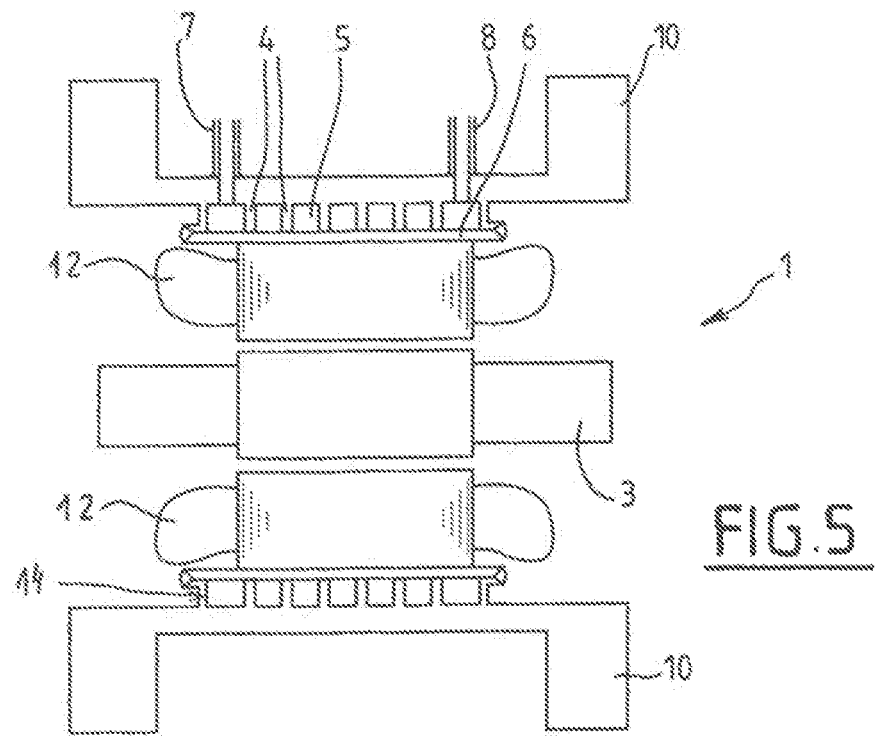
FIG. 5 shows a schematic and partial view in cross section, illustrating a second exemplary embodiment of the invention.
Figure 6:
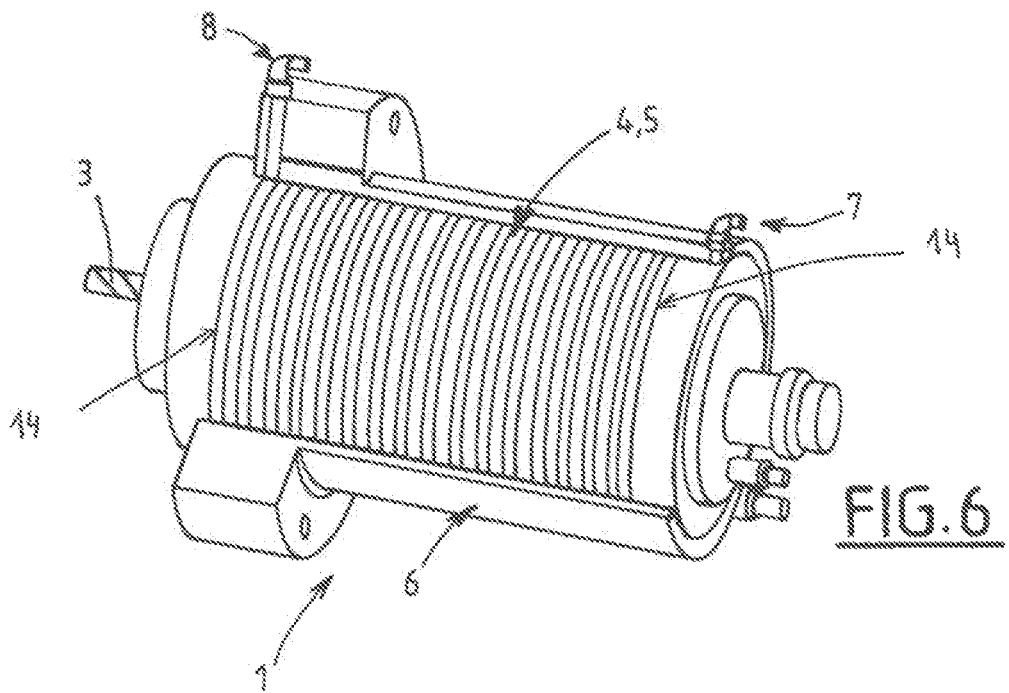
FIG. 6 shows a partially exploded perspective view of an example of a structure of a motor to which the invention may apply.

In the embodiment variant in FIG. 5, the ribs 4, 14 that delimit the channels of the cooling circuit 5 are situated on the face of the casing 10 that is turned toward the inside of the motor 1. The closing cover 6 is interposed between the casing 10 and the stator 12. The inlet 7 and outlet 8 of the circuit 5 may be situated on the outer face of the casing 10.

This variant also provides welding and/or brazing only at the ribs/lips 14 for the same advantages. The only possible drawback of this solution is a potential risk of leaking between the motor cavity and the cooling fluid through the welds. This potential leaking is detrimental to the motor 1 and is more difficult to detect and repair than in the variant in FIG. 4.

The invention, while being of simple structure and inexpensive, makes it possible to cool an electric motor stator 2 effectively while isolating the following volumes from one another: motor cavity, cooling fluid, volume around the casing 10.

The cooling circuit 5 may contain for example water. The water enters via an inlet tube 7 and flows for example helically about the longitudinal axis 11 between the stator 10 and the closing structure 6.

This helical flow may be made possible by helical machining of the corresponding face of the casing 10. As the water passes between the stator 10 and the closing structure 6, it extracts heat at the casing 10 by convection and at the motor stator 12 by conduction through the casing 10. The water finally exits via the outlet tube 8.

Of course, the cooling fluid may be water or any other liquid or gas or two-phase mixture capable of transporting heat.

The exchange of heat between the fluid and the casing 10 may be boiling.

The geometry of the lip/rib 4, 14 is not limited to the examples described provided that it fulfills the function of not deforming the casing 10 during the welding phase.

The machined helix which forms the ribs 4, 14 and is used for the flow of the fluid may be realized by a shape which is helically wound around the casing 10 (tube, flat profiled element for example). In addition, this helix may also not be present (a single channel or multiple channels which do not have a helix for example).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fail within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An electric motor, comprising a stator and a rotor that are disposed in a casing, the casing comprising a first face provided with a plurality of ribs and intended to be in contact with a fluid for cooling the electric motor, the plurality of ribs being arranged in a structure extending from a first end associated with a first rib to a second end associated with a second rib, the electric motor being provided with a closing structure which is fastened in a sealed manner to the first face of the casing so as to delimit, with the first face of the casing, a space that forms a circuit for the fluid for cooling the electric motor, the closing structure being fastened to the first face of the casing by welding and/or brazing and/or crimping only at said ribs, the closing structure comprising at least one cover, characterized in that the ribs have a thickness and a height that gives the ribs a flexibility greater than a flexibility of a rest of a body of the casing to which they are secured and the plurality of ribs have a thickness of between 0.5 and 5% of a transverse dimension or of an outside diameter of the stator.

2. The electric motor of claim 1, wherein:
the ribs extending in a direction of the electric motor, and
the closing structure is fastened by welding and/or brazing and/or crimping at two locations, respectively, to the first and second ribs.

3. The electric motor of claim 1, wherein the plurality of ribs each has a lower end that is secured to the casing and a terminal upper end to which the closing structure is welded and/or brazed and/or crimped.

4. The electric motor of claim 1, wherein the plurality of ribs have a thickness or width that is two to four times less than that of the rest of the body of the casing body.

5. The electric motor of claim 1, wherein the plurality of ribs have a height of between two and twenty times their thickness.

6. The electric motor of claim 1, wherein the closing structure comprises at least one tube that is welded to the plurality of ribs and/or to the cover and forms an inlet or an outlet for the cooling fluid.

7. The electric motor of claim 1, wherein said electric motor has no mechanical sealing system or screw-fastening system between the closing structure and the casing.

8. The electric motor of claim 1, wherein the cooling circuit contains a heat transfer liquid.

9. The electric motor of claim 1, wherein the plurality of ribs form one or more helical grooves or one or more non-helical circular grooves in the first face of the casing about a longitudinal axis of the casing.

10. A method for manufacturing the electric motor of claim 1, said method comprising a step of fastening the sealed closing structure to the first face of the casing so as to delimit, with the first face of the casing, the circuit for the fluid for cooling the electric motor, wherein the closing structure comprises at least one cover, and in that the closing structure is fastened to the first and second ends of the plurality of ribs by welding.

11. The method of claim 10, wherein, at the end of the step of welding the closing structure to the first face of the casing, the method does not have at least one of: a finishing machining operation for the casing so as to correct a deformation of the casing, and a heat treatment of the casing intended to geometrically stabilize the casing, by welding.

12. An electric motor, comprising a stator and a rotor that are disposed in a casing, the casing comprising a first face provided with a plurality of ribs and intended to be in contact with a fluid for cooling the electric motor, the plurality of ribs being arranged in a structure extending from a first end associated with a first rib to a second end associated with a second rib, the electric motor being provided with a closing structure which is fastened in a sealed manner to the first face of the casing so as to delimit, with the first face of the casing, a space that forms a circuit for the fluid for cooling the electric motor, the closing structure being fastened to the first face of the casing by welding and/or brazing and/or crimping only at said ribs, the closing structure comprising at least one cover, characterized in that the ribs have a thickness and a height that gives the ribs a flexibility greater than a flexibility of a rest of a body of the casing to which they are secured and the plurality of ribs have a deformability (in mm) per unit of deformation force (in newtons), which is at least two times greater than the flexibility of the rest of the body of the casing.

* * * * *